United States Patent [19]

Hoffman et al.

[11] Patent Number: 4,558,923

[45] Date of Patent: Dec. 17, 1985

[54] PICOSECOND BISTABLE OPTICAL SWITCH USING TWO-PHOTON TRANSITIONS

[75] Inventors: Craig A. Hoffman, Arlington, Va.; Jerry R. Meyer, Baltimore; Filbert Bartoli, Upper Marlboro, both of Md.

[73] Assignee: The United States of America as represented by the Secretary of the Navy, Washington, D.C.

[21] Appl. No.: 564,623

[22] Filed: Dec. 22, 1983

[51] Int. Cl.[4] .......................... G02F 1/015; G02F 1/35
[52] U.S. Cl. ...................................... 350/354; 350/393
[58] Field of Search ................................ 350/354, 393

[56] References Cited

U.S. PATENT DOCUMENTS

| | | | |
|---|---|---|---|
| 3,516,728 | 6/1970 | Fenner | 350/390 |
| 4,221,472 | 9/1980 | Smith et al. | 350/356 |
| 4,253,728 | 3/1981 | Venkatesan | 350/96.15 |

OTHER PUBLICATIONS

Agrawal et al, "Theory of Two-Photon Double-Beam Optical Bistability", Physical Review A, 12–1981, pp. 3173–3181.
Blue, M. D. "Optical Adsorption in HgTe & HgCdTe", Physical Review, 4–1964, pp. A226–A234.
Hanamura, E. "Optical Bistable System Presponding in Pico-Second". Solid State Communications, vol. 38, pp. 939–942, Pergamon Press Ltd. 1981. Great Britain.
"Bistable Optical Devices Promise Subpicosecond Switching" IEEE Spectrum Jun. 1981, pp. 26–33.
Semiconductor Physics Springer-Verlag: N.Y. 1973 p. 222.
Meyer, J. R.; Kruer, M. R.; Bartoli, F. J.: "Optical Heating in Semiconductors: Laser Damage in GE, Si, InSb, and GaAs"; J. Appl. Physics, 51(10), Oct., 1980: pp. 5513–5521.

*Primary Examiner*—William H. Punter
*Attorney, Agent, or Firm*—Robert F. Beers; William T. Ellis

[57] ABSTRACT

A bistable optical switch comprising a Fabry-Perot resonator containing a nonlinear semiconductor medium with a desired band structure and whose susceptibility (refractive index) varies with optical energy density. The Fabry-Perot resonator is biased to a point where two stable transmission states are possible. Switching is accomplished by pumping the nonlinear material with an energy hw in the range $\frac{1}{2}\Delta_g < hw < \Delta_g$, where $\Delta_g$ is the bandgap between the upper valence band and the conduction band of the nonlinear material, in order to stimulate a two-photon valence-to-conduction band absorption transition at a non-minimum energy and thereby make possible a one-hw photon virtual transition between the heavy hole and split-off valence bands of the nonlinear material. This virtual transition alters the susceptibility thereby switching the resonator to a different stable transmission state. Switching times on the order of picoseconds are obtained because switching-time is not dependent on the carrier recombination time.

17 Claims, 5 Drawing Figures

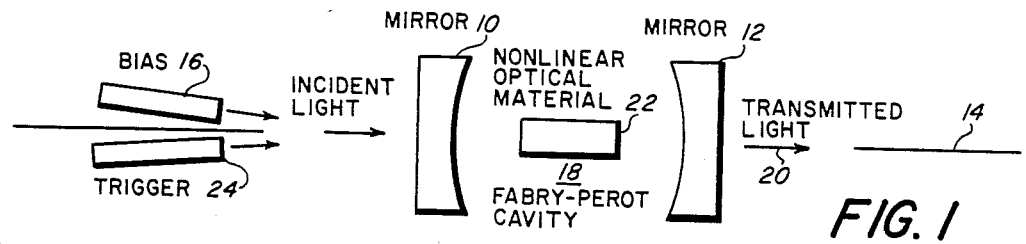
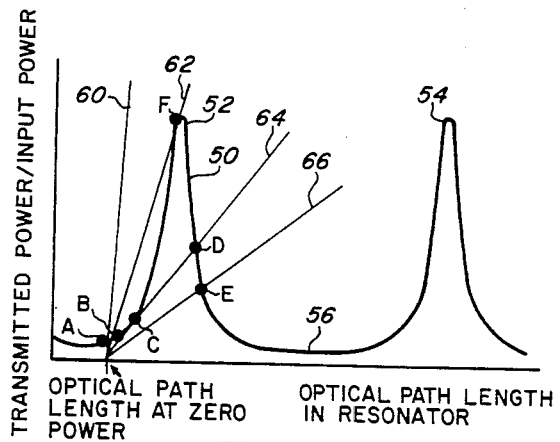
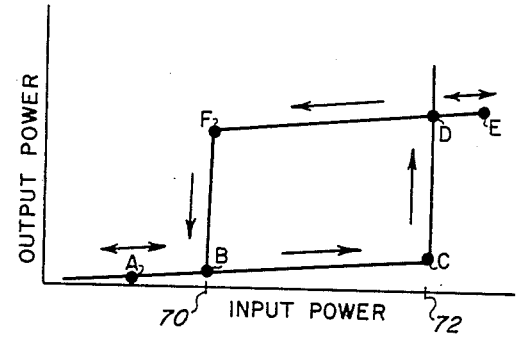
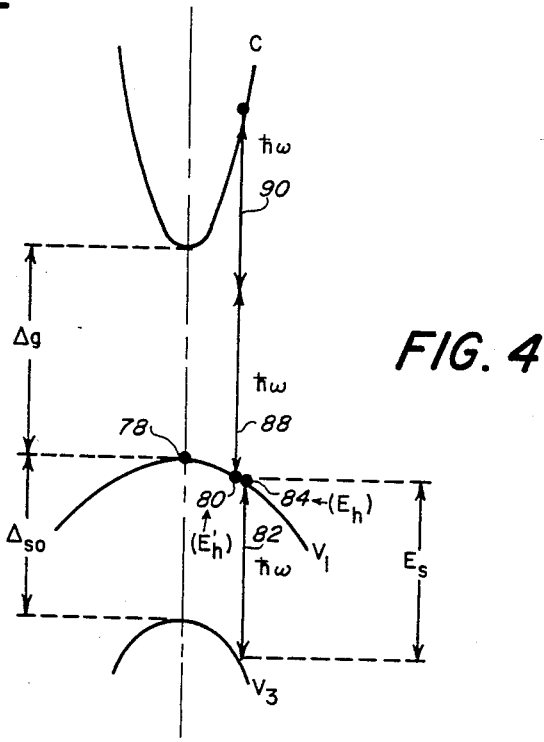
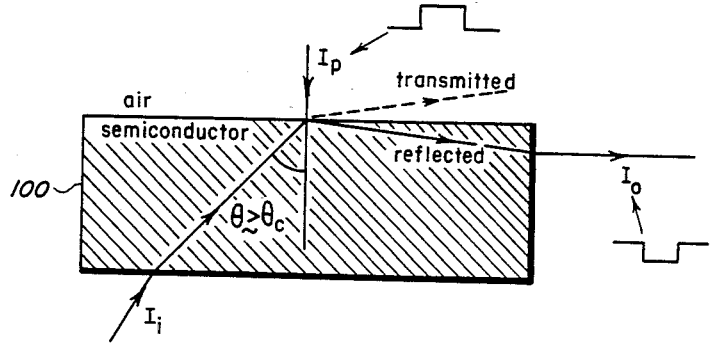

PICOSECOND BISTABLE OPTICAL SWITCH USING TWO-PHOTON TRANSITIONS

BACKGROUND OF THE INVENTION

The present invention relates generally to the field of high speed switching, and more particularly to the field of bistable optical switches.

There is a significant amount of research in the field of bistable optical devices for use in high-speed optical communication systems and optical computers. A bistable optical device is a device that exhibits two distinct states of transmission of light and that can be switched between these two states by a temporary change and in the level of the light input, i.e. the output versus input characteristic exhibits an optical hystersis. Such bistable switches potentially have a variety of attractive features such as (1) an extremely large bandwidth -greater than $10^{13}$ Hz; (2) an ultra-short switching time; (3) a capability for parallel processing; and (4) the ability to process light directly. Accordingly, such bistable switching elements would have significant speed advantages over their electronic component counterparts and can be used in such applications as memory elements, differential amplifiers, pulse shapers and limiters, optical triodes, and logic elements. Note in particular that with the development of glass fiber optical communications systems requiring high-capacity repeater and terminal systems, such bistable devices have the necessary bandwidth and switching speed needed to meet the requirements of such systems.

Currently there are a number of schemes proposed for realizing a bistable optical switch with switching times in the picosecond regime. For example, the review article entitled "Bistable Optical Devices Promise Sub-picosecond Switching" by P. W. Smith and W. J. Tomlinson, IEEE Spectrum, June 1981, page 26, notes that a bistable optical switching device may be formed by disposing a nonlinear optical material within the optical cavity of a Fabry-Perot resonator. The nonlinear optical material is chosen to exhibit a significant optical Kerr effect-that is, the refractive index is a function of the intensity of the light propagating in the material. It has been found that such a device exhibits optical bistability under proper bias conditions. A weak light beam is applied to cause a photo-induced change in the refractive index of the nonlinear material thereby causing a switching to a new transmission state. This switching can occur in picoseconds. However, it has been found that the photon absorption in the material that caused the switching to a new transmission state has a decay which is dominated by carrier recombination time-typically nanoseconds or longer. Thus, this optical switch can not be switched again until after a sufficient time has elapsed for the carriers to recombine. Faster switching could be possible if the nonlinear material disposed in the resonator is highly doped to reduce the carrier lifetime. However, such a high carrier doping would be accompanied by a corresponding decrease in the refractive index nonlinearity which causes the bistability. Accordingly, the carrier recombination process is a major limitation to the switching speed of such a bistable optical device.

Another approach for constructing a bistable optical device is to utilize a Fabry-Perot resonator employing exciton effects. See the articles by H. M. Gibbs, S. L. McCall, and T. N. C. Venkatesan, Optical News 6, Summer (1979); E. Hanamura, Solid State Communications, 38, 939 (1981). The exciton effects in semiconductors are used as the source of the refractive index nonlinearity. However, to date the response times obtained from such devices exceed 10 nanoseconds.

Thus, it can be seen from the above that current schemes for bistable optical switches all have switching times of 1 nanosecond or more.

OBJECTS OF THE INVENTION

Accordingly, it is an obJect of the present invention to provide a bistable optical device with switching times in the picosecond range.

It is a further obJect of the present invention to provide a bistable optical device with switching times in the picosecond range and which requires switching energies comparable to or less than previous bistable optical devices.

It is yet a further obJect of the present invention to provide a bistable optical switch which has a switching time independent of the carrier recombination operation.

Other objects, advantages, and novel features of the present invention will become apparent from the detailed description of the invention, which follows the summary.

SUMMARY OF THE INVENTION

Briefly, the above and other objects are achieved in a bistable optical device comprising an optical resonator with an optical resonant cavity therein and including structure for extracting a light output beam from the optical resonant cavity, and including a nonlinear material which is essentially optically transparent disposed in the optical resonant cavity. This nonlinear material has an upper and a lower valence band and a conduction band and has an optical length which depends on the intensity of light in the optical resonant cavity. The nonlinear material must have a band structure such that at some momentum location with a nonminimum energy there is a possible virtual transition between the upper and lower valence bands, with the energy difference between these upper and lower valence bands at this momentum location being greater than ½ the bandgap energy between the upper valence band and the conduction band but less than this bandgap energy. This device further includes structure for pumping photon energy which is greater than ½ the bandgap between the valence and the conduction bands but less than this bandgap in order to stimulate a two-photon absorption transition between the upper valence band and the conduction band and thereby stimulate the above-noted virtual transition between the upper and lower valence bands.

In an preferred embodiment, this optical resonator is a Fabry Perot resonator and the nonlinear material is a semiconductor material. The photon pumping structure should include structure for optically biasing the Fabry-Perot resonator with an input power such that the Fabry-Perot resonator has at least two stable transmission states at this optical bias.

In this preferred embodiment, the lower and upper valence bands of the semiconductor material comprise a split-off valence band and a heavy hole valence band, respectively. The virtual transition between the split-off and heavy hole valence bands approximately but not exactly lines up at the same momentum location as the two-photon transition between the heavy hole band and the conduction band. The photon energy pumped by the pumping structure may advantageously have its energy chosen such that $\Delta E_h = E_h - E_h'$ is a small positive energy, where $E'_h$ is the energy of the hole created by the two-photon absorption transition, and $E_h$ is the energy of a heavy hole which is near in energy to the hole created by the two-photon transition and which may undergo a virtual transition between the heavy hole and the split-off valence bands to thereby contribute to the susceptibility of the semiconductor material.

BRIEF DESCRIPTION OF THE DRAWINGS

FIG. 1 is a schematic diagram of a Fabry-Perot bistable optical switch.

FIG. 2 is a graphical representation of the response of a Fabry Perot resonator in terms of transmitted power/input power versus optical pathlength in the resonator.

FIG. 3 is a graphical representation of the input power versus the output power of the Fabry Perot resonator illustrating hystersis effect.

FIG. 4 is a schematic diagram showing the heavy hole band, the split-off band, and the conduction band, and the optical transitions therebetween.

FIG. 5 is a schematic diagram of one means for obtaining a reduction in the optical bias beam following the application of a light pulse.

DETAILED DESCRIPTION OF THE PREFERRED EMBODIMENT

In essence, the present bistable optical device utilizes the Fabry-Perot approach wherein a nonlinear material is disposed in the optical resonant cavity of the Fabry-Perot resonator. However, pumping structure is included for pumping this nonlinear material with an energy which is greater than $\frac{1}{2}$ the bandgap energy between the valence and conduction bands and less than the full bandgap energy in order to stimulate two-photon absorption transitions. These two-photon absorption transitions facilitate virtual transitions between lower and upper valence energy bands in the material by perturbing the populations of energy states near those involved in the transitions. For the example of an electron making a two-photon absorption transition from the heavy hole valence band to the conduction band of a given material, there is now a hole located in the heavy hole valence band with an energy above the energy at the bottom of the band. Thus, the virtual transition of an electron carrier can occur between the lower split-off valence band of the material and the heavy hole valence band to contribute to the susceptibility. When the mechanism creating the altered distribution of free carriers (the photon pumping) is removed, then the free hole or holes created in the heavy hole valence band by the two-photon transition merely relax toward the top of the valence band to the lowest energy in the band. This relaxation generally occurs in times on the order of 1 picosecond. Thus, the virtual transitions are removed and the bistable device is ready to be switched again.

Referring now to the drawings, FIG. 1 shows a schematic diagram of one embodiment of the present invention. The Fabry-Perot resonator comprises two partially-transmitting mirrors 10 and 12 facing each other on a common optical axis 14 and forming a Fabry-Perot cavity 18 therebetween. To reduce light diffraction losses, these mirrors are often concave. The mirrors 10 and 12 are partially reflecting and partially transmitting. A bias pumping source 16 is provided for placing the Fabry-Perot resonator in a desired transmission state. A trigger pumping source 24 is provided to switch the resonator between different transmission states to effect the bistability. Light transmitted from the bias pumping source 16 and the trigger pumping source 24 is applied to the mirror 10 and partially transmitted therethrough into the Fabry-Perot cavity 18. This light transmitted through mirror 10 bounces back and forth between the two mirrors 10 and 12. A certain portion of this light is transmitted through mirror 12 as beam 20. If the length of the Fabry-Perot cavity 18 corresponds to an integral number of half-wavelengths of the incident light, then successive transmitted beams will all be in phase and will interfere constructively to produce a strong transmitted beam 20.

This constructive interference is termed resonance and corresponds to a maximum of light power inside the resonator. For Fabry-Perot cavity lengths far from an integral number of half-wavelengths, i.e. far from resonance for a given light frequency, destructive interference reduces the transmitted light, and most of the incident light is reflected. FIG. 2 is a graphical illustration of the foregoing constructive-destructive interference phenomena for a Fabry-Perot cavity. The curve 50 shows the transmitted power/input power plotted against the optical pathlength in the Fabry-Perot cavity. It can be seen that the peaks 52 and 54 correspond to resonance peaks where the Fabry-Perot cavity length is approximately equal to an integral number of half wavelengths of the incident light. The valley 56 of the curve 50 represents Fabry-Perot cavity lengths where destructive interference occurs.

In order to transform the above described Fabry-Perot resonator into a bistable optical device, a nonlinear optical material 22 is disposed in the Fabry-Perot cavity 18 between the mirrors 10 and 12. This material should exhibit a significant optical Kerr effect, i.e., its refractive index is a function of the intensity of the light in the material. Note that the optical length of the nonlinear material 22 is equal to its physical length multiplied by its refractive index. Accordingly, the use of a material with a refractive index which is a function of the intensity of light propagating in the material permits control over the optical path length of the material and thus the optical path length in the Fabry-Perot cavity 18

It has been found that optical bistability arises when two conditions are met simultaneously: (1) the optical length within the nonlinear material depends on the intensity of the light in the Fabry-Perot cavity, (2) the intensity of the light in the Fabry-Perot cavity depends on its optical pathlength.

Because the nonlinear material has an optical length which is a function of the intensity of the light, the optical pathlength in the resonator is proportional to the light intensity therewithin. This intensity is, in turn, proportional to the transmitted light power. This relation is represented by the family of straight lines 60, 62, 64, and 66. The slopes of these lines are inversely proportional to the input power, and they all pass through a common point corresponding to the resonator's optical length at 0 power. The position of this common point can be adjusted by changing the resonator tuning.

For a given input power, the points of intersection of the appropriate straight line with the resonator transmission curve 50 represent possible steady state operating points. For example, at low input powers, such as that corresponding to point A, there is a negligible nonlinear effect, and the transmission from the Fabry- Perot resonator is low. As the input optical pumping power from the bias source 16 is increased, the power in the resonator begins to build up, but the transmission remains relatively low until point C is reached. At higher input powers, the device suddenly switches to a high-transmission state corresponding to point D, as a low transmission state no longer exist. Physically, the increased light bias in the resonator changes the refractive index within the nonlinear material so as to tune the resonator closer to the resonance, thereby increasing the light power therewithin, a positive feedback effect. Further increases in input power, such as that corresponding to point E, tune the resonator away from resonance, thereby reducing the power therein, a negative feedback effect which stabilizes the output power.

In essence, it can be seen that there is a hystersis effect between the straight lines 62 and 64. This hystersis effect is shown in FIG. 3. It can be seen that there are two stable transmission states, a high transmission state and a low transmission state, for each input power between the input power points 70 and 72. Accordingly, for Fabry-Perot resonators biased with an input power between the points 70 and 72 in FIG. 3, there are two stable transmission states at each power point in this range. For lower input powers less than point 70 in FIG. 3, the high-transmission state no longer exist, and the device must switch to the low-transmission state corresponding to point B.

It can be seen from a review of FIG. 2 and FIG. 3 that two stable transmission states only occur when the Fabry-Perot resonator is tuned near resonance. When the light in the resonator is no longer sufficient to keep it tuned near resonance, then only one transmission state will exist. Note however that if the resonator is tuned too close to the transmission peak, then there is no hystersis in the output versus power curve.

In prior art Fabry-Perot switches, the photon energy that is pumped into the resonant cavity is comparable to the valence-conduction bandgap energy in the nonlinear semi-conductor material used. Accordingly, single-photon band-to-band transitions dominate the absorption. Such transitions cause the susceptibility to change by an amount $\Delta\chi_{eh}$ due to the induced occupation of electron states near the bottom of the conduction band and hole states near the top of the valence band. This one-photon absorption and susceptibility change occurs very quickly. However, when the optical switching radiation is removed, the susceptibility $\chi$ returns to its unperturbed value only after the recombination of the excess electrons and holes generated by the pumped switching energy. Thus, typical times for switching the device "off" are at least 10 nanoseconds.

The present invention utilizes the Fabry-Perot switching configuration. However, it employs a nonlinear semiconductor material 22 amenable to a specific virtual transition, and it employs pumping structure 24 which stimulates those virtual transitions in the semiconductor in order to give a contribution to the susceptibility $\chi(w)$. In particular, it has been determined that significant changes in the semiconductor susceptibility occur for photon pumping energies below the bandgap energy $\Delta_g$ but greater than $\frac{1}{2}\Delta_g$ due to virtual transitions stimulated by two-photon absorption transitions. There are a number of different virtual transitions which can be used to change the semiconductor susceptibility. However, in order to understand the virtual transitions and how they are stimulated, a specific example is provided below.

In this example, the virtual transitions between the heavy hole valence band $V_1$ and the split-off valence band $V_3$ are used to contribute to the susceptibility. This band structure is shown in the energy-momentum diagram of FIG. 4. Virtual transitions between these two bands are stimulated if the carrier populations are suddenly perturbed in energy states near those energy states in the $V_1$ band capable of virtual transitions. For a split-off to heavy hole valence band virtual transition, holes must be created in the heavy hole band near the momentum location for the desired virtual transition. Note that the energy of the hole created must be greater than the minimum energy for the heavy hole band. (The reason for this energy requirement will become clear later.) Accordingly, it is desired to perturb the carrier population of the energy state at, by way of example, an energy $E'_h$, i.e., create a hole in the heavy hole band at the momentum location 80 with an energy $E'_h$. Since the splitoff band $V_3$ and the heavy hole band $V_1$ normally have no holes with energies near $E'_h$, the sudden addition of a hole in the heavy hole band, stimulates a virtual transition 82 and causes a large change in the susceptibility of the semiconductor. Since the susceptibility $\chi$ is related to the index of refraction n of the semiconductor by the equation $n^2 = 1 + 4\pi\chi$, a significant change in the index of refraction is obtained. Accordingly, the Fabry-Perot resonator of the present invention realizes the hystersis response shown in FIG. 3.

The significant advantage realized from using this virtual transition method to change the semiconductor susceptibility is that following the removal of the mechanism creating the altered distribution of free carriers (in this case the hole in the heavy hole band), the change in the susceptibility $\Delta\chi_{hs}$ relaxes to zero in a time on the order of 1 picosecond. This very fast $\Delta\chi_{hs}$ relaxation occurs because the free hole created in the heavy hole band relaxes toward the top of the valence band (the top of the valence band represents the highest electron energies, but the lowest hole energies) to an energy much smaller than $E'_h$ in times on the order of 1 picosecond. (For a reference discussing this point, see K. Seeger, *Semiconductor Physics*, Springer-Verlag, New York, 1973, page 222.) The reason for this fast relaxation of the free hole is that the hole is at a non-equilibrium energy and tends to move to the equilibrium energy position at the top of the valence band very quickly. Thus, it is clearly important that the heavy hole created have an energy greater than at the top of the valence band so that this hole can then relax to this minimum energy at the top of the band. Note that this process is in marked contrast to the susceptibility change $\Delta\chi_{eh}$ discussed above for previous devices, which relaxes to zero on a time scale several orders of magnitude slower than $\Delta\chi_{hs}$. This significantly longer $\Delta\chi_{eh}$ relaxation time occurs because of a reliance on carrier recombination to remove the carrier population perturbation.

From the above, it can be seen that some mechanism must be used for creating a hole near the energy states to be involved in the desired virtual transitions. In the present invention, a two-photon absorption transition is utilized. In the example of the virtual transition between the heavy hole and split-off valence bands, the two-photon transition is between the heavy hole valence band $V_1$ and the conduction band C and is represented in FIG. 4 by the consecutive hw lines 88 and 90.

The two-photon absorption process is a quantum mechanical effect wherein two-photons, of the same or different energies, excite an electron from an intial energy state to a new atomic or molecular energy state which has an energy which is greater than the initial energy state by the sum of the energies of the two-photons. Note that in such a two-photon absorption transition, neither photon is capable, by itself, of exciting a transition to the new energy state. The two-photon absorption process is a simultaneous two-photon absorption but includes a transition to an intermediate virtual energy level (not to be confused with the virtual transition between the split-off and heavy hole valence bands). Note that the two-photon absorption process is a very weak process which will absorb only a small amount of the light on each pass through nonlinear semiconductor material 22 in the Fabry-Perot cavity 18.

If the two-photon absorption transition is to be used to create a hole in the heavy hole band, then certain material and energy pumping requirements must be met. The first requirement is that the pumping or trigger photons for switching the device "on" have an energy hw in the range $\frac{1}{2}\Delta_g < hw < \Delta_g$, where $\Delta_g$ is the valence to conduction bandgap energy. The upper range for hw should be approximately twice the thermal energy $K_s t_o$. This range is logical since if the photon energy is less than one-half the bandgap energy $\Delta_g$, a simultaneous two-photon absorption would not be sufficient to allow a transition to any part of the conduction band. If the photon energy is equal to one-half $\Delta_g$, then a transition is only allowed between the top of the valence band and the very bottom of the conduction band. Such a transition is undesirable since the transition must create a hole in the heavy hole band with an energy greater than at the top of the valence band so that the hole can then relax to the top of the band. Likewise, photon energies equal to or greater than $\Delta_g$ will allow one-photon transitions to dominate. Thus, in order to obtain a two-photon absorption transition at a momentum location 80 with hole energies greater than the minimum, hw must be in the range noted above. Due to conservation of energy and momentum, the energy $E_h'$ where the excess hole or holes are created using this photon trigger energy can be calculated by the following equation:

$$E_h' = (2hw - \Delta_g)/(1 + m_h/A_e m_e),$$

where $\Delta_g$ is the aforementioned valence to conduction minimum bandgap, $m_e$ is the electron effective mass at the bottom of the conduction band, and $A_e$ is the conduction band non-parabolicity factor. See J. R. Meyer, M. R. Kruer, and F. J. Bartoli, J. Applied Physics 51, 5513 (1980).

Note that due to conservation of momentum requirements, the two-photon absorption transition 88-90 and the virtual transition 82 stimulated thereby should approximately form a straight line in the energy diagram of FIG. 4. If these two transitions form an angle, then different momenta would be involved and phonon assistance would be required to effect the process.

It can be seen from a review of the energy diagram of FIG. 4 that at the desired momentum location 84 the energy difference $E_s$ between the bands across which the stimulated virtual transition occurs has the same range as the trigger pumping photon energy hw, namely $$\tfrac{1}{2}\Delta_g < E_s < \Delta_g.$$

Again, note that the upper range for $E_s$ should be less than $\Delta_g$ by approximately 2 kB T. In essence, the pumping energy hw should include photons with energies $E_s$ sufficient to facilitate a one-photon virtual transition between two valence bands at a non-minimum energy.

From the above, it can be seen that there is a general requirement placed on the semiconductor band structure that there be at least some momentum locations with non-minimum energies where the energy difference $E_s$ between the stimulated virtual transition bands at these desired momentum locations is in the range $$\tfrac{1}{2}\Delta_g < E_s < \Delta_g,$$

where $\Delta_g$ is the bandgap energy between the valence and conduction bands for the material. In the present example, this $E_s$ energy difference range must hold between the split-off valence band and the heavy hole valence band for at least one momentum location with a non-minimum energy.

As noted above, the virtual transition 82 and the two-photon transition 88-90 should form approximately a straight line. The line is only approximately straight because the photon energy is chosen so that the heavy hole energy at the momentum location 84 has an energy $E_h$ which is slightly greater than $E_h'$, the energy for the created hole at point 80. Note that $E_h$ may be calculated in accordance with the following equation:

$$E_h = (hw - \Delta_{so})/(m_h/m_{so} - 1),$$

where $\Delta_{so}$ is the spin-orbit splitting, $m_h$ is the heavy hole effective mass, and $m_{so}$ is the effective mass for holes in the split-off band. This higher energy $E_h$ for the virtual transition momentum location 84 ensures that the susceptibility change will maintain the same sign. If the same sign is not maintained for the susceptibility change, then in some situations the Fabry-Perot resonator may come out of the hystersis region.

There are a variety of suitable materials with band structure such that the valence energy bands to be used to effect the virtual transition have at least some momentum locations with non-minimum energies where the energy difference between the two bands is greater than one-half of the band gap between the valence and conduction bands and less than the full bandgap. An example of such a suitable material is CdTe at 77K. An appropriate photon energy hw for triggering this material, i.e., stimulating the virtual transition, is 0.96eV (1.3μm). A pumping trigger source 24 for stimulating this virtual transition in the material CdTe could be any laser or optical parametric oscillator. For example, lithium niobate pumped with neodymium could be utilized to generate an adjustable laser line at 1.3-1.4 microns.

Another suitable material is $Hg_{1-x}Cd_xTe$ with the composition in the range of $0.7 < X < 1.0$. An operating wavelength of 1.3 to 1.4μm could be utilized in the laser pumping source.

It should be noted that the trigger pumping source 24 and the bias pumping source 16 may either comprise two different lasers at the same or different wavelengths, or a single laser source with a beamsplitting configuration. Preferably, the bias pumping source 16 and the trigger pumping source 24 are disposed to direct light along the axis 14 into the Fabry-Perot cavity 18. Typically, the sources 16 and 24 may be either colinear or disposed at a slight angle to the axis 14. It should be noted that the bias pulse from the bias source 16 and the trigger pulse from the trigger pumping source 24 should overlap between the two mirrors 10 and 12 of the Fabry-Perot cavity 18. Generally, the trigger pulse may be on the order of a picosecond pulse.

As noted previously, there are a variety of Fabry-Perot configurations which may be utilized to implement the present invention. One such configuration comprises utilizing a block of appropriate semiconductor material with two parallel facets opposing each other. A mirror coating, for example, an appropriate dielectric, may then be disposed on each of the parallel facets in order to form the Fabry-Perot cavity 18. The composition of the dielectric coating may be controlled in a well-known manner in order to control the degree of reflectivity.

As noted previously, the present Fabry-Perot switch may be turned "on" simply by means of a short photon pulse from the trigger pumping source 24. Such a short pulse in the appropriate photon range causes a two-photon transition, thereby stimulating a virtual transition which effects the susceptibility. Upon removal of this short trigger pulse excitation, the excited holes or transient hole population causing the change in the susceptibility relaxes on a time scale comparable to the relaxation time for hot or excited holes, i.e., generally on the order of 1 picosecond.

It should be noted that this device requires approximately $10^{-8}$ to $10^{-7}$ Joules to switch "on", i.e., to switch to a high transmission state. This low energy requirement is realized because the transient holes are selectively created at an energy which gives an optimum change in the susceptibility. Control over this hole energy is achieved simply by controlling the photon energy. Additionally, these holes are created by means of two-photon absorption transitions which absorbs very little energy from the light passing inside the Fabry-Perot cavity.

The Fabry-Perot switch is turned "off", i.e., is switched to a low transmission state simply by reducing the beam intensity $I_o$ from the bias pumping source 16 for a short period of time so that the input energy in the cavity 18 moves away from resonance and out of the section in FIG. 3 where there are two stable transmission states.

This reduction of the bias beam intensity $I_o$ can be accomplished by applying the bias beam through a semiconductor block 100 as shown in FIG. 5. The output $I_o$ is taken from the beam reflected internally within the semiconductor 100. The input beam intensity $I_i$ from the bias source 16 is applied at an angle $\theta$ to the bottom face of the semiconductor 100, with this angle of incidence chosen so that it is just slightly larger than the critical angle $\theta_c$. Accordingly, the output beam intensity $I_o$ is 100% of the input beam intensity $I_i$ in the absence of any externally applied excitations. However, when a short pulse $I_p$ in the psec range is applied to the top face of the semiconductor 100, then the refractive index in the semiconductor 100 is altered due to state filling by hot holes. (See "Laser-Induced Changes in the Dispersive Properties of p-$G_e$ Due to Intervalence-Band Transitions" by R. B. James of D. L. Smith, Physical Review B, The American Physical Society, Vol. 23, No. 8, 15 April 1981.) The critical angle $\theta_c$ then increases to slightly more than $\theta$, and the intensity of the reflected beam $I_o$ decreases to approximately 50% of $I_i$. As soon as this short pulse $I_p$ switches off, the hot holes relax and the refractive index returns to the value for total internal reflection.

It is again reiterated, that there are a variety of materials which may be utilized to facilitate the present bistable switch. Likewise, there are a variety of virtual transitions which may be utilized to affect the susceptibility of the semiconductor material. For example, other transitions which might be utilized are transitions between the heavy hole valence band and the light hole valence band, or transition between the light hole valence band and the split-off valence band.

For proper operation the bias beam from the bias pumping source 16 should have a sufficient photon density in order to maintain the resonator in the hysteresis area 70-72 of FIG. 3.

Note there are a number of other optical components which could be utilized to effect the present bistable optical switch.

The CdTe semiconductor material chosen for the present example is a direct gap semiconductor material. A direct gap means that there is alignment of momenta for the smallest energy gap between the conduction band and the valence band. It is preferred that direct gap semiconductor materials be utilized to implement the present bistable switch.

It should be noted that there are various compositions of $Hg_{1-x}Cd_xTe(0.7 < X < 1.0)$ which can be employed to optimize the change in the susceptibility $\Delta\chi$ and hence the switching energy efficiency. The temperature can also be varied to optimize the energy efficiency and the switching time. Higher temperatures would lead to switching times even less then 1 picosecond. Other binary and ternary compounds may also be advantageously used.

The present bistable optical switch has a number of features which are unique compared to any previous optically bistable device. For example, in the present device the mechanism for altering the susceptibility involves virtual transitions between two valence energy bands. In the example provided in the specification, the transitions are between the heavy hole and the split-off valence bands. The use of these virtual transitions at non-minimum energies to alter the susceptibility allows the transient excitation causing the switching to relax in a time on the order of 1 picosecond. Additionally, the means for perturbing the free carrier population in order to stimulate the virtual transitions is different, i.e., two-photon absorption is employed rather than one-photon absorption. The incorporation of these two changes in the basic bistable optical switch design leads to switching times which are orders of magnitude faster than those demonstrated for any previous semiconductor device. Additionally, the energy required for such switching compares favorably to the energy required for previous devices.

Obviously many modifications and variations of the present invention are possible in light of the above teachings. It is therefore to be understood that within the scope of the appended claims the invention may be practiced otherwise than as specifically described.

What is claimed and desired to be secured by Letter Patent of the United States is:

1. A bistable optical device with switching times in the picosecond range comprising:
    an optical resonator with an optical resonant cavity therein and including means for extracting a light output beam from said optical resonant cavity,
    a nonlinear material which is essentially optically transparent disposed in said optical resonant cavity, said nonlinear material having a conduction band and at least an upper and a lower valence bands with an energy spacing therebetween such that a two-hw photon transition can occur from a non-minimum energy location in said upper valence band to said conduction band, and a one-hw photon virtual transition at a non-minimum energy can occur between said upper and lower valence bands, said nonlinear material having an optical length which depends on the intensity of light in said optical resonant cavity; and means for pumping photon energy hw in the range $\frac{1}{2}\Delta_g < hw < \Delta_g$ into said optical resonant cavity in order to stimulate said virtual transition via the two-photon transition, where $\Delta_g$ is the bandgap between the upper valence band and the conduction band of said nonlinear material.

2. A bistable optical device as defined in claim 1, wherein said optical resonator is a Fabry-Perot resonator.

3. A bistable optical device as defined in claim 2, wherein said nonlinear material is a semiconductor material.

4. A bistable optical switch as defined in claim 3, wherein said photon pumping means includes means for optically biasing said Fabry-Perot resonator with an input power such that the Fabry-Perot resonator has at least two stable transmission states at the optical bias.

5. A bistable optical device as defined in claim 4, wherein said semiconductor material is a direct bandgap semiconductor material.

6. A bistable optical device as defined in claim 5, wherein the lower and upper valence bands of said semiconductor material are the split-off valence band and the heavy hole valence band, respectively, and at approximately the two-photon absorption transition momentum location said semiconductor material has an energy gap $E_s$ between said split-off valence band and said heavy hole valence band which is less than the bandgap $\Delta_g$ and greater than one-half the bandgap $\Delta_g$.

7. A bistable optical device as defined in claim 6, wherein said nonlinear semiconductor material is CdTe.

8. A bistable optical device as defined in claim 7, wherein said nonlinear semiconductor material is $Hg_{1-x}Cd_xTe$, $0.7 << 1.0$.

9. A bistable optical switch with switching times in the picosecond range comprising:

a Fabry-Perot resonator including an optical resonant cavity;

a nonlinear semiconductor material disposed in said optical resonant cavity of said Fabry-Perot resonator, said semiconductor material having a conduction band, a heavy hole valence band, and at least one other valence band, and having a refractive index which depends on the intensity of light in said optical resonant cavity; and means for optically biasing said Fabry-Perot resonator with an optical input power such that the Fabry-Perot resonator has at least two stable transmission states, and for pumping photon energy hw in the range $\frac{1}{2}\Delta_g < hw < \Delta_g$ into said optical resonant cavity in order to stimulate a two-photon absorption transition between said heavy hole valence band and said conduction band and thus switch between said two stable transmission states in said Fabry-Perot resonator, where $\Delta_g$ is the bandgap between the heavy hole valence band and the conduction band of said semiconductor material, wherein said semiconductor material has a band structure with a one-hw photon potential virtual transition between two valence bands thereof at a non-minimum energy.

10. A bistable optical switch as defined in claim 9, wherein said nonlinear semiconductor material is a direct bandgap semiconductor material.

11. A bistable optical switch as defined in claim 10, wherein said semiconductor material has a band structure such that the two-photon transition between the heavy hole valence band and the conduction band and the one-photon virtual transition between said two valence bands line up at approximately but not exactly the same momentum.

12. A bistable optical switch as defined in claim 11, wherein said at least one other valence band in said semiconductor material is the split-off valence band and said virtual transition is a one-hw photon virtual transition between said split-off valence band and said heavy hole valence band.

13. A bistable optical switch as defined in claim 11, wherein said semiconductor material is $Hg_{1-x}Cd_xTe$, $0.7 < x < 1.0$.

14. A bistable optical switch as defined in claim 12, wherein the photon energy pumped by said pumping means has its energy hw chosen such that $\Delta E_h = E_h - E_h'$ is a small positive energy, where $E_h'$ is the energy of a hole created by the two-photon absorption transition in said heavy hole band and $E_h$ is the energy of a heavy hole near in energy to the hole created by the two photon transition and capable of said virtual transition between the heavy hole and split-off valence bands to thereby contribute to the susceptibility of the semiconductor material.

15. A method for switching an optical Fabry-Perot resonator with switching times in the picosecond range, said Fabry-Perot resonator having an optical resonant cavity with a nonlinear semiconductor material disposed therein, said semiconductor material having a conduction band, a heavy hole valence band and at least one other valence band with a band structure such that a two-hw photon transition can occur from a non-minimum energy location in said heavy hole band to said conduction band, and a one-hw photon virtual transition can occur at a non-minimum energy between two of the valence bands, said semiconductor material also having a refractive index which depends on the intensity of light in said optical resonant cavity, said method comprising the steps of:

biasing said optical resonant cavity of said Fabry-Perot resonantor with an optical input power such that said Fabry-Perot resonator has at least two stable transmission states at the bias input power; and pumping photon energy hw in the range $\frac{1}{2}\Delta_g < hw < \Delta_g$ into said optical resonant cavity in order to stimulate a virtual transition between valence bands via a two-photon absorption transition and thus switch between said at least two stable transmission states in said Fabry-Perot resonator, where $\Delta_g$ is the bandgap between the heavy hole valence band and the conduction band of the semiconductor material.

16. A bistable optical switch with switching times in the picosecond range comprising:

a Fabry-Perot resonator including an optical resonant cavity;

a nonlinear semiconductor material disposed in said optical resonant cavity of said Fabry-Perot resonator, said semiconductor material having a conduction band, a heavy hole valence band, and at least one other valence band and having a band structure with a direct bandgap between said heavy hole valence and conduction bands, and capable of having a 2-hw photon transition occur from a non-minimum energy location in said heavy hole band to said conduction band, and a 1-hw photon virtual transition occur at a non-minimum energy location between two of the valence bands, said semiconductor material also having a refractive index which depends on the intensity of light in said optical resonant cavity;

means for optically biasing said Fabry-Perot resonator with an optical input power such that the Fabry-Perot resonator has at least two stable transmission states at this optical bias; and means for perturbing the populations of energy states with energies near the valence band energy states with virtual transitions that can give a contribution to the susceptibility to thereby switch between said two stable transmission states in said Fabry-Perot resonator, wherein said energy state perturbing means comprises means for pumping photon energy hw in the range $\frac{1}{2}\Delta_g < hw < \Delta_g$ into said optical resonant cavity in order to stimulate a two-photon absorption transition at said perturbed energy states, where $\Delta_g$ is the bandgap between the heavy hole valence band and the conduction band of said semiconductor material.

17. A bistable optical switch as defined in claim 16, wherein said at least one valence band in said semiconductor material comprises a split-off valence band and at approximately the two-photon absorption transition momentum location said semiconductor material has an energy gap $E_s$ between said split-off valence band and said heavy hole valence band which is less than the bandgap $\Delta_g$ and greater than one-half the bandgap $\Delta_g$; and the photon energy pumped by said pumping means has its energy hw chosen such that $\Delta E_h = E_h - E_h'$ is a small positive energy, where $E_h'$ is the energy of the hole created by the two-photon absorption transition, and $E_h$ is the energy of a heavy hole near in energy to the hole created by the two-photon transition and capable of said virtual transition between the heavy hole and split-off valence bands to thereby contribute to the susceptibility of the semiconductor material.

* * * * *